United States Patent Office 3,474,272
Patented Oct. 21, 1969

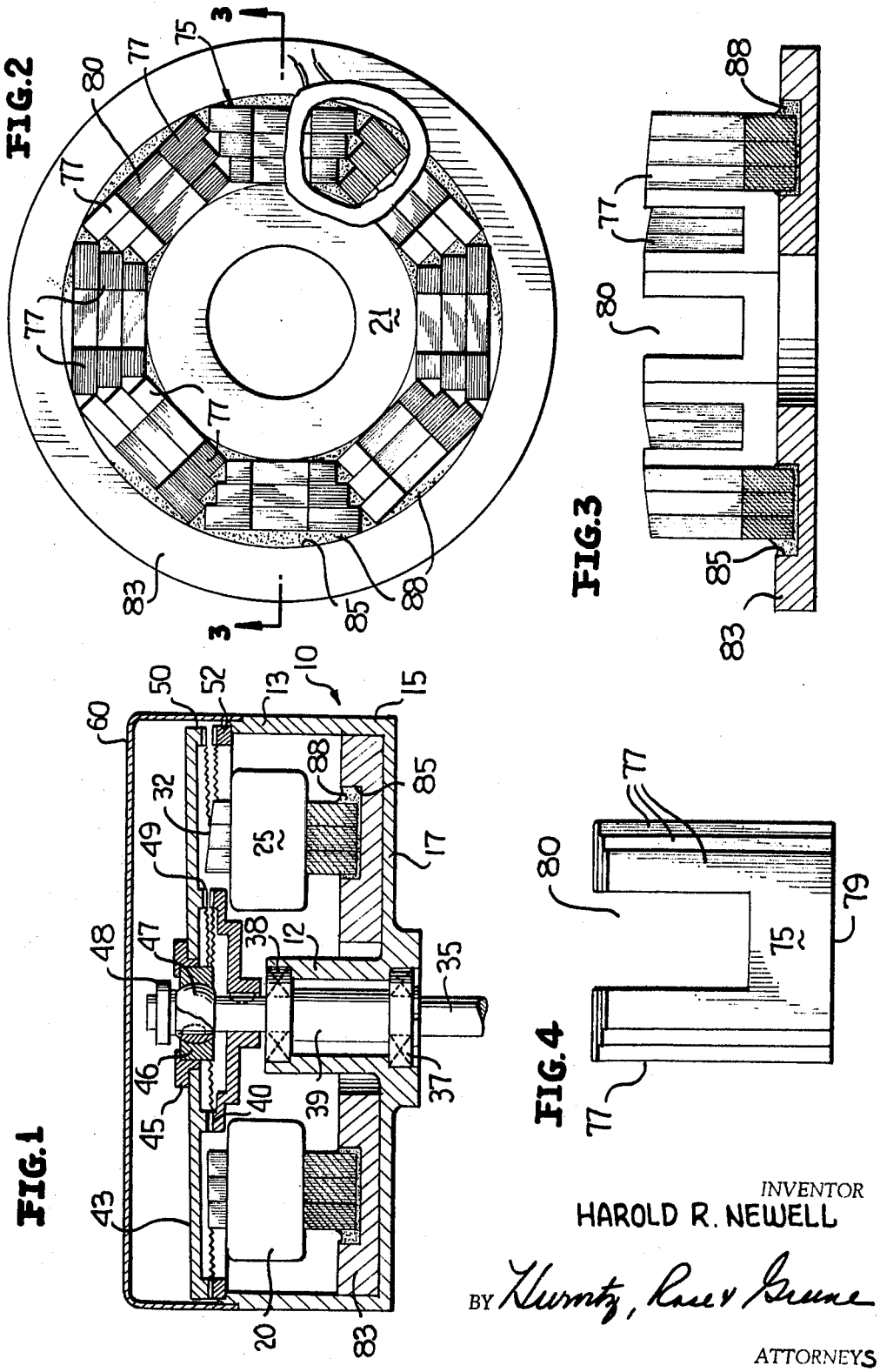

3,474,272
WOBBLING ROTOR STEP MOTOR WITH STATOR COILS AND POLE ARRANGEMENT
Harold R. Newell, South Newbury, N.H., assignor to Mesur-Matic Electronics Corporation, Warner, N.H., a corporation of Delaware
Filed May 9, 1968, Ser. No. 727,838
Int. Cl. H02k 37/00
U.S. Cl. 310—49　　　　　　　　　　　　　　9 Claims

ABSTRACT OF THE DISCLOSURE

A wobbling rotor step motor with a stator having a plurality of core elements arranged and fastened in a regular polyhedral configuration, each core element being U-shaped and having progressively varying leg width to permit intercoupling with the adjacent core elements. The poles of the stator are each formed by the adjacent two legs of separate core elements, one leg from each of the adjacent elements, and the pole faces are tapered to permit the rotor wobble during step motor operation. Stator coils are wound on each pole, and a dual phase excitation switching sequence assures reinforcement of magnetic fields of adjacent coils via the shared core element.

BACKGROUND OF THE INVENTION

The present invention relates generally to step motors, and in particular to improvements in the stator core structure of step motors.

In my co-pending application for United States Letters Patent, bearing Ser. No. 664,331, entitled "Harmonic Drive for Digital Step Motor," filed Aug. 30, 1967, I describe a step motor utilizing a wobbling plate or disk rotor having circular ring gears that cooperate with gears attached to the motor housing and to an extension coupled to the motor shaft. The disk rotor is wobbled relative to the shaft by sequential energization of the motor phases, to produce a wavelike meshing of the cooperating gears and thereby rotation of the shaft in highly accurate incremental displacements. The motor phases are established by an annular magnetic core which may be a wound toroidal core having slots milled therein to establish equiangularly separated poles on which the stator coils are wound. That is to say, the stator core may be fabricated by winding a strip of magnetically permeable sheet material in tight successive layers in an annular or toroidal configuration. The core is then provided with angularly spaced slots, as by a milling process, to provide poles commonly connected at one end and to accommodate field coils to be wound about these poles. Several field windings (e.g. eight) may be necessary or desired in a given motor structure, and typically, adjacent windings are energized in pairs to turn on the motor phases according to the sequence A+B, B+C, C+D, D+E, etcetera, thereby enhancing the force applied to the motor shaft.

Such a stator core construction process is time consuming, complex, and costly. It is therefore a principal object of the present invention to provide an improved stator core configuration and to provide methods of construction of such a core configuration.

SUMMARY OF THE INVENTION

According to the present invention, the stator core is composed of an annular magnetically permeable plate on which are mounted a plurality of flat U-shaped magnetically permeable core elements of several laminations each, the core elements being fastened to said plate with legs extending perpendicularly from the plate. Each core element is positioned with one of its flat sides tangent to a circle concentric with the annular mounting plate, the points of tangency being equiangularly separated from immediately adjacent points of tangency such that the core elements are spaced at equal angles about the circle. Each core element has legs of successively greater width with distance outwardly from the center of the circle. The stator core may be visualized, then, as composed of a plurality of identical U-shaped core elements, fastened together along a common end at which each has its legs bridged, and forming in a juxtaposed arrangement of elements a regular polyhedral configuration.

Each stator coil is wound about the respective side-by-side legs of adjacent core elements, such that when two adjacent coils or windings are energized, their magnetic fields reinforce one another through the shared core element.

BRIEF DESCRIPTION OF THE DRAWINGS

The above and still further objects, features and attendant advantages of the present invention will become apparent from a consideration of the following detailed description of a preferred embodiment thereof, especially when taken in conjunction with the accompanying drawings, in which:

FIGURE 1 is a sectional view taken through the axis of symmetry of a wobble plate step motor, showing the general arrangement of components therein;

FIGURE 2 is a plan view of the stator of the motor of FIGURE 1;

FIGURE 3 is a sectional view of the stator taken along the lines 3—3 of FIGURE 2; and FIGURE 4 is a front view of one of the core elements of the stator.

DESCRIPTION OF THE PREFERRED EMBODIMENT

The stator of the present invention is primarily contemplated for use in a multiphase step motor of the type disclosed, for example, in my aforementioned co-pending application Ser. No. 664,331, although it may also be used in other motors, if desired. In any event, it is neither intended nor desired that any limitations be placed on the scope of my present invention except as set forth in the claims.

For the sake of convenience to the reader and clarity of the description, an embodiment of a step motor disclosed in my aforementioned specification will be described in some detail here. Referring to FIGURE 1, the wobble plate step motor there shown includes an annular cup-shaped housing 10 comprising a pair of coaxial cylindrical walls 12, 13 bridged at a common end 15 by a wall 17. Housing 10 is composed of any suitable non-magnetic material and is adapted to partially enclose and retain the windings 20 and core 21 of the stator 25. The stator core configuration will be described in detail presently. For the moment, it is sufficient to note that the pole faces 32 of core 21 are slightly angled, e.g., at 1°, relative to the plane perpendicular to the axis of the core, to permit the desired slight wobble of the rotor (disk or plate) 43; and that the end terminations or leads of the windings 20 may be brought out through the housing at any convenient point or points (not shown) to permit connection to an energizing circuit. Driving circuits such as those disclosed in my copending applications Ser. No. 581,334, filed on Sept. 22, 1966, and Ser. No. 616,325, filed on Feb. 13, 1967, may be used for energizing the stator windings, although other phase activating circuits may alternatively be employed, as desired.

A shaft 35 is disposed along the axis of the symmetrical motor structure thus far described, mounted for rotation in bearings 37 and 38 at the bridged and free ends, respectively, of cylindrical wall 12 of housing 10.

The shaft is provided with a larger diameter section 39 or with suitable collars to insure its retention within the bearings, which are preferably capable of accepting axial as well as radial loads. A circular ring gear 40 is fastened via a flange member to shaft 35, for rotation with the shaft, or vice versa.

The rotor or armature 43 is a magnetically permeable rigid circular plate (although as previously stated, the particular shape or character of the rotor may vary, with little or no change in the principles and concepts underlying the provision of the stator in accordance with the present invention). A bearing cup 45 is fastened with a centrally located hole in rotor 43 to hold the rotor to a bearing 46 including a ball member 47 having an axial hole of sufficient diameter to accept the shaft in slideable relationship, but with little or no radial movement. Thus, the rotor may rotate relative to the shaft, and may pivot on the ball joint to assume a cocked position relative to the shaft. Retaining ring 48 press-fitted on shaft 35 prevents the rotor from lifting beyond a narrow, predetermined limit. In this manner, the entire ball joint or universal joint may move axially along the shaft to prevent the existence of any play or looseness in the meshing of the gears, which might otherwise occur with wear, while confined radially on the shaft.

Additional ring gears 49, 50, and 52 are provided on the rotor disk and the housing, the relative positions of these circular gears and of the motor configuration being such that confronting teeth on cooperating outer gears 50 and 52 and cooperating inner gears 49 and 40 mesh only along a limited sector. The number of teeth on each gear is selected to produce very slow and very accurate shaft motion upon energization of the stator windings, and thus, wobbling of the rotor on the "tracks" established by the gears. The stator, including windings 20 and core 21, may be potted within housing 10 by use of epoxy resin or other suitable material. A cover 60 composed of non-magnetic material is used to close the housing.

In operation, the stator windings are selectively energized by the driver or switching circuit according to a preselected switching format, such as the simultaneous excitation of two adjacent coils in the sequence $A+B$, $B+C$, $C+D$, $D+E$, and so forth. The eight motor phases shown in the preferred embodiment are purely for the sake of illustration, the number of phases being more or less, if desired. As the windings are excited in the recited sequence, a corresponding sector of the rotor is pulled toward the stator and the rotor undergoes a wobble motion in which the cooperating gear teeth mesh to produce the desired shaft rotation.

With eight field windings, each revolution of wobble requires eight phase switchings. As a consequence of the axial freedom of the ball joint and the wobble plate (rotor), the force associated with the magnetic field generated by the stator in response to winding excitation in the switching format is divided between the two sets of gears, producing substantially equal meshing pressure on the gears in the sector corresponding to the actuated stator coils. The pivotal relationship of the rotor on the ball joint, together with the slight taper of the stator pole faces, permits the cocking or tipping, and hence, the wobble motion of the rotor.

The important role of the stator in assuring accuracy and precision of the wobble, and thereby, of the shaft rotation is readily observed in the foregoing description of the stepping motor operation. The present invention yields a vast simplification in the production and structure of the stator without degrading this accuracy. Referring to FIGURES 2, 3, and 4, each stator core element 75 is composed of a plurality of laminated U-shaped sheets of magnetically permeable metal (see e.g. FIGURE 3). Moreover, each core element becomes progressively wider with distance from the axis of the motor assembly (coincident with the axis of symmetry in FIGURE 2) in a stepped arrangement of leg widths, as a result of the three different sizes of U-shaped laminations of which each element is composed. In particular, as shown in FIGURE 4, each set of laminations is characterized by a pair of spaced-apart, parellel legs 77 joined at a common end by a bridging member 79, the spacing between the legs being constant for each core element, although the width of each of the legs in each set diminishes (or increases, depending on point of view) relative to the next adjacent set.

In practice, each core element may be made up of a standard lamination such as Allegheny Ludlum U–312, for the wideset set, and this standard width may be trimmed (cut) to provide appropriate leg widths for the two smaller sets of laminations. The three laminated sets are themselves bonded or laminated together to provide registry of channels 80 therein, and each core element so produced is then ready for assembly in the regular polyhedral configuration shown in FIGURE 2. To this end, it is convenient to provide an assembly jig (not shown) in the form of a regular polygon whose side length match the size of the shortest lamination set of which each core element is composed. Such a jig may have projections conforming to the width (slightly less) of the channels and extending from the midsection of each side to support the core elements in inverted fashion therefrom. The elements are then conveniently clamped to these projections (and thereby, to the assembly jig itself) by means of U-shaped clamps whose legs abut against the core element legs at each side of the channel, and whose bridging section contains a threaded fastener to be threaded into a mating tapped hold in the respective projection.

Having provided this arrangement, the core elements are confined in the desired polyhedral configuration shown in FIGURE 2, and it remains only to fasten or join them together along the unobstructed edge of each bridging member 79. This is conveniently and simply accomplished by use of a stator core mounting plate 83 in the form of a thin ring of magnetically permeable (or not) material having an annular slot 85 cut therein, of sufficient width to accept the core elements in their polyhedron-like form, and of sufficient depth to permit secure retention of each core element therein by use of a layer of epoxy cement 88 or other suitable bonding material. When the bonding material has set (e.g. is cured) the stator core is removed from the assembly jig and is ready to have the field coils wound or placed on each stator pole, one coil 82 being shown for the sake of example and to prevent cluttering of the drawings in FIGURE 2.

As shown most clearly in FIGURE 2, each stator pole on which a coil such as 82 is wound is composed of adjacent legs of two side-by-side core elements, that is, one leg of each of the two proximate core elements. In operation, then, when two adjacent windings are energized in the aforementioned simultaneous two phase excitation sequence (i.e., $A+B$, $B+C$, $C+D$, etcetera), their magnetic fields reinforce one another through the shared core element.

To provide the slightly taperd pole faces on the stator core, these faces may be milled off at the desired angle, say 1°, relative to a plane perpendicular to the axis of the stator and tangent to the extreme inner edge of each pole face. Alternatively, each lamination or sheet of each core element set may be arranged for slight but progressive offset, prior to bonding or laminating them together, to produce an effective taper. In still another alternative structure, the pole faces may be flat, (i.e., not angled), and the rotor disk 43 cut on an angle necessary or desired to permit a tilted effect.

I claim:

1. A stator for a digital step motor, comprising an annular plate having an annular slot with a depth less than the thickness of the plate therein, and a plurality of upstanding core elements in the form of U-shaped magnetically permeable members of progressively varying leg width having their bridging portions for the legs bonded in and to said slot, said core elements together producing a regular polyhedral formation on said plate.

2. The combination according to claim 1 wherein each of said core elements comprises a plurality of sets of laminated magnetically permeable sheets, said sets being bonded together in stepped leg width configuration and having registered channels therein.

3. The combination according to claim 1 wherein adjacent legs of adjacent core elements in said polyhedral formation form separate poles of said stator, each pole composed of two legs, one from each of the adjacent elements, and wherein a stator coil is wound on each pole, encompassing said two legs of which each is composed.

4. The combination according to claim 3 wherein the face of each pole is tapered at an angle relative to the plane perpendicular to the axis of symmetry of the stator core.

5. The combination according to claim 4 wherein said taper of each pole face is provided by laminated core elements, the laminations of each core element being progressively stepped upwardly toward the center of said stator.

6. The combination according to claim 1 wherein said plate is composed of magnetically permeable material.

7. A step motor comprising
a shaft,
at least one pair of cooperating ring gears having confronting spaced frictional surfaces and having a common axis with said shaft,
a magnetically permeable rotor supporting one of said gears,
means pivotally coupling said rotor to said shaft to permit inclination of said rotor relative to said shaft, and
electromagnetic means for selectively forcing said rotor to pivot on said coupling means to sequentially force portions of said gears into frictional contact to produce relative rotation of said gears, said electromagnetic means including a stator, said stator comprising
a support member having an annular slot therein,
a plurality of upstanding U-shaped magnetic core elements of progressively varying leg width having bridging portions for the legs fastened within said slot, said core elements arranged together in a regular polyhedral formation on said plate.

8. The combination according to claim 7 wherein such of said core elements comprises a plurality of sets of laminated magnetically permeable sheets, said sets being bonded together in stepped leg width configuration and having registered channels therein.

9. The combination according to claim 7 wherein adjacent legs of adjacent core elements in said polyhedral formation form separate poles of said stator, each pole composed of two legs, one from each of the adjacent elements, and wherein a stator coil is wound on each pole, encompassing said two legs of which each is composed.

References Cited
UNITED STATES PATENTS

| | | | |
|---|---|---|---|
| Re. 22,549 | 9/1944 | Plensler | 310—82 |
| 1,495,784 | 5/1924 | Fereday | 310—82 |
| 2,871,382 | 1/1959 | Bouvier | 310—82 |
| 3,134,917 | 5/1964 | Miller | 310—49 |
| 3,341,725 | 9/1967 | Gifford | 310—80 |

WARREN E. RAY, Primary Examiner

U.S. Cl. X.R.

310—82, 83, 180, 216, 254